May 16, 1961  S. A. SCHERBATSKOY  2,984,745
DIRECTIONAL RADIATION DETECTOR
Filed Dec. 22, 1955  4 Sheets-Sheet 4

INVENTOR.
Serge A Scherbatskoy

United States Patent Office 2,984,745
Patented May 16, 1961

2,984,745
DIRECTIONAL RADIATION DETECTOR
Serge A. Scherbatskoy, 804 Wright Bldg., Tulsa, Okla.
Filed Dec. 22, 1955, Ser. No. 554,718
4 Claims. (Cl. 250—71.5)

This invention deals with a new method and apparatus for studying the characteristics of an unknown medium by means of nuclear radiation. It deals particularly with the measurement of the properties of various regions of a surrounding medium that are remote from the point of observation and are therefore not accessible for a direct measurement "in situ."

Various objects of my invention will be apparent from the enclosed specification and drawings in which:

Fig. 7b shows a reproducer driven in a definite relation to the output of a radiation source for reproducing the records obtained in Fig. 7a.

Figure 1:
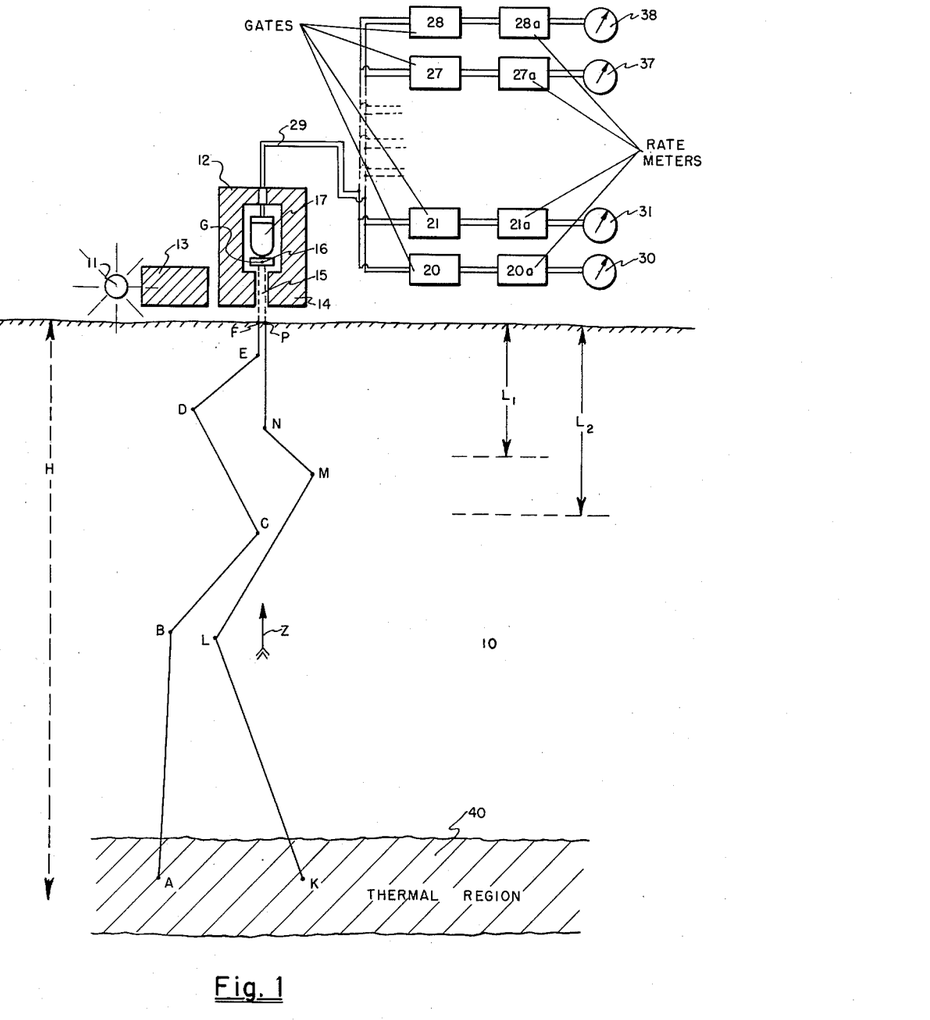
Fig. 1 illustrates diagrammatically the application of the principles of my invention to the study of soil structure.

The embodiment shown in Fig. 1 is particularly applicable to the building of roads, airports, laying foundations for buildings, since in all these instances it is important to know the density of the soil and particularly the variation of density with the depth. The measurements used in the prior art were expensive and laborious and involved the removal of cores or soil samples from below the earth's surface.

Referring now more particularly to Fig. 1, the method shown therein consists in irradiating the soil 10 by means of a source of neutrons 11 and measuring the gamma rays that are radiated from within the soil as a result of the interaction of the neutrons with various elements present in the soil. These gamma rays are measured by means of a detector 12 separated from the source 11 by shield 13. The shield 13 is of a conventional type and is adapted to protect the detector from radiations that are emitted by the source 13 in the direction of the detector. The detector 12 is directional, i.e. it is surrounded by a shield 14 that absorbs all gamma radiations except those that arrive in the upward direction (indicated by the arrow Z) along a narrow and elongated channel 15. The detector comprises a scintillating crystal 16 and a photomultiplier 17. The crystal is sufficiently large so as to absorb substantially completely the incident photons and to produce light flashes proportional to their energy. We obtain thus in the output of the photomultiplier a succession of current impulses having magnitudes representing the energies of the corresponding photons. These pulses are transmitted through a plurality of gates 20, 21 . . . 27, 28. Assume that the gate 20 transmits photons within the energy range extending from $$E_1 - \frac{\Delta E}{2} \text{ to } E_1 + \frac{\Delta E}{2}$$

i.e. the gate responds to a beam of photons having mean energy $E_1$ and width $\Delta E$. Similarly, the gate 21 responds to a beam of photons having mean energy $E_2$ and width $\Delta E$, etc. etc. and the gate 28 responds to a beam of photons having mean energy $E_n$ and width $\Delta E$. It is noted that $E_1 < E_2 < \ldots < E_n$. The energy $E_1$ is usually quite low and may be of the order of a few kilovolts or as low as we wish to make it. However, the energy $E_n$ should be less than 2.3 mev. The frequency of occurrence of the pulse outputs of the gates 20, 21 . . . 27, 28 is indicated on the meters 30, 31 . . . 37, 38.

The manner of operation of this method can be explained as follows:

The fast neutrons emitted by the source 11 undergo numerous collisions in the soil until they reach thermal velocities. The maximum concentration of thermal neutrons occurs at a depth H which we designate as the "slowing down depth." The region 40 at the depth H shall be designated as the "thermal region" since it is the region of maximum thermal neutrons. Each of the thermalized neutrons remains in this region for a time interval of the order of one millionth of a second until it is captured by one of the various elements present in this region. Each of such capture processes is accompanied by the emission of a gamma ray. Consequently, the thermal region 40 becomes a source of gamma rays of capture, and for our purposes it is important to note that the gamma rays of capture are contained within an energy band extending from 2.3 mev. to about 9 mev. That is, there is a lower threshold of 2.3 mev. and there are no gamma rays emitted by the thermal region 40 having an energy less than 2.3 mev.

Now we shall consider the gamma rays intercepted by the detector 12 at the earth's surface. The detector is directional, i.e. responsive only to the gamma rays arriving vertically along the arrow Z. The gamma rays intercepted by the detector may be "direct gamma rays" or "scattered gamma rays." The "direct gamma rays" are transmitted directly from the thermal region 40 to the detector 12. They travel along a straight vertical path and do not undergo a single collision with the surrounding medium. Consequently, each direct gamma ray retains its original energy when it arrives at the detector. Since, as stated above, these gamma rays have energies from 2.3 mev. to about 9 mev., none of these gamma rays is detected on the meters 30–38 since none of the gate networks 20–28 transmits signals corresponding to gamma rays having energies above 2.3 mev.

The above discrimination against hard gamma rays constitutes an important distinction between our method and prior methods which were based on chemical identification of various elements in soil by means of nuclear spectroscopy. These prior methods measure gamma rays of capture and therefore make measurements only in the region from 2.3 mev. to 9 mev. These methods identify each energy value in this region with a particular chemical element, i.e. 2.3 mev. corresponds to hydrogen, 7 mev. corresponds to chlorine, etc. In the method of the present invention, however, we exclude this energy region entirely and measure only photons having energies below 2.3 mev. Therefore, our method has no relation to the prior methods since the energy spectrum of gamma rays that we detect does not carry any information regarding the chemical composition of the soil.

It is thus apparent that in the above prior method one measured the energy spectrum of those gamma rays of capture that are emitted by the thermal region 40 and arrive at the detector without undergoing a single scattering. These gamma rays retain, therefore, their original energy and their energy spectrum can be correlated with the relative abundance of various chemical elements contained in the thermal region. In the method of this invention we measure only those gamma rays that underwent multiple collisions in the layers of earth that are above the thermal region. These gamma rays are degraded in energy and as shown hereafter their energy spectrum will be correlated with the physical properties of the layer of earth above the thermal region 40, and not with the chemical composition of the thermal region.

We shall now consider two examples of multiple collision illustrated in Fig. 1. Two photons are emitted at the points A and K in the "thermal region" 40 and after a number of scatterings we obtain two degraded photons arriving at the detector in upward direction from the points E and N. One of the emitted photons underwent multiple scattering represented by the zigzag trajectory ABCDEF and the other emitted photon underwent multiple scattering represented by the trajectory KLMNP. It is important to note that the scattering is accompanied by a degradation of energy, i.e. at each collision the scattered photon has a lower energy than the incident photon since the incident photon contributes a portion of its energy to the Compton electron and the remainder of its energy escapes in the form of the scattered photon.

We shall now determine the response of the detector 12 to the degraded photon that resulted from the trajectory ABCDEF and to the degraded photon that resulted from the trajectory KLMNP. The response of the detector will not depend on the history of the whole process of degradation, but will depend principally on the last scattering. More specifically, if we refer to the trajectory ABCDEF, we can state that the response of the detector 12 will depend on the location of the point E at which the last scattering took place and will be independent of the location of previous scattering represented by the points B, C, D. It is apparent that the distance of the point E to the detector is related to the energy of the last degraded photon emitted at the point E and is independent of the energy of the original photon emitted at the point A which underwent its first scattering at the point B. On the basis of statistical considerations, we may state that the larger is the distance of the point of last scattering E to the detector, the larger is the energy of the last degraded photon emitted at the point E. As shown in Fig. 1, the actual distance from the point E to the point of detection G is EG. However, we are not interested in the portion of the photon path in air above the earth's surface (since in this portion practically no absorption takes place). Therefore we shall designate this distance as EF. We may thus state on the basis of statistical consideration that the energy of the photon emitted at the point of last scattering E and absorbed by the detector is directly related to the length of its path of travel EF and the larger is the path EF, the larger is the energy of the photon emitted at the point E.

It is thus apparent that EF represents the most probable length of a photon path of a given energy. The value EF is of the same order of magnitude as the relaxation length of a photon in earth. There is a definite relationship between the relaxation length of a photon and its energy, and the following table illustrates this relationship:

| E (photon energy in mev.) | .01 | .015 | .02 | .04 | .06 | .08 | .15 | .30 | .50 | 1.00 |
|---|---|---|---|---|---|---|---|---|---|---|
| Relaxation length in cm | .015 | .05 | .11 | .66 | 1.39 | 1.89 | 2.70 | 3.58 | 4.35 | 6.25 |

Figures 2, 3A, 3B:
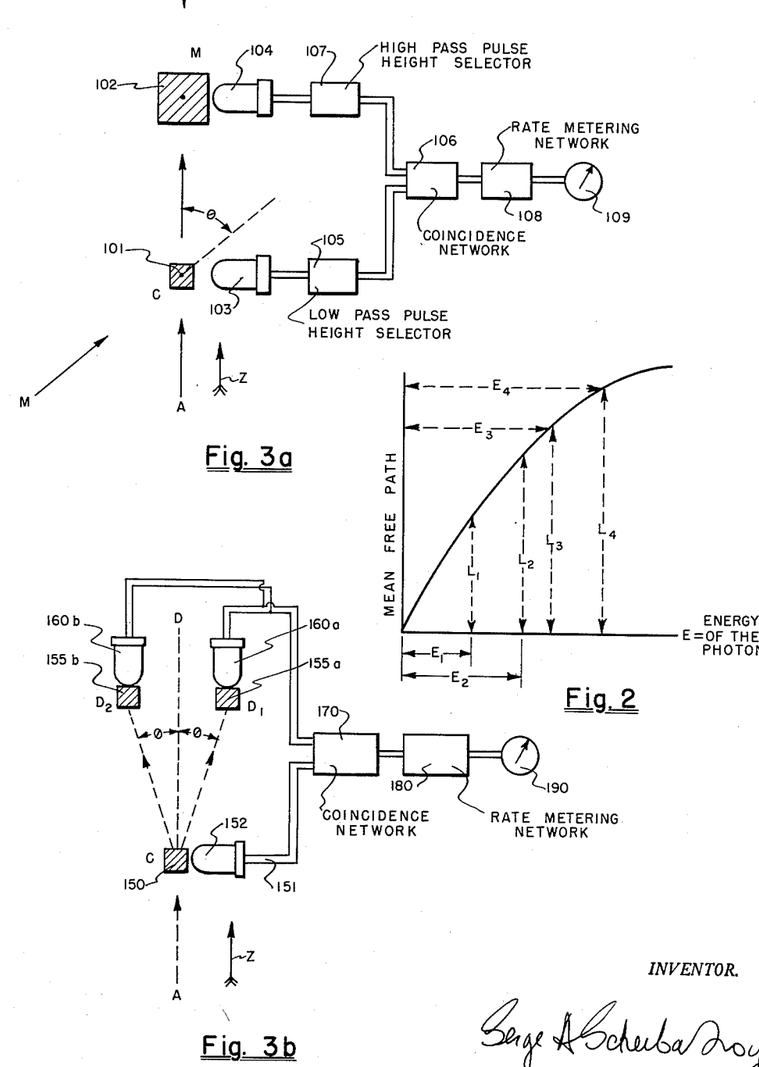
Fig. 2 shows diagrammatically the relationship between the energy of a photon and its mean free path.
Fig. 3a shows a directional radiation detector to be used in connection with the arrangement of Fig. 1, said detector comprising two radiation sensitive elements aligned along the direction of incoming photons.
Fig. 3b shows a modified directional radiation detector in which the alignment of the radiation sensitive elements has been arranged so as to overcome certain limitations due to the occurrence of parasitic impulses caused by thermal noise, in the photomultipliers included in said detector.

A similar relationship between the mean free path of a photon and its energy is shown diagrammatically in Fig. 2. More specifically, the abscissas in Fig. 2 indicate the energies of photons and the ordinates indicate the corresponding mean free paths.

We shall now compare again the trajectory ABCDEF associated with a photon originally released at the point A with the trajectory KLMNP associated with the photon originally released at the point K. We note that the last degraded photon of the first trajectory having the path EF and the last degraded photon of the second trajectory has the path NP. Since EF is smaller than NP we can state that in accordance with the diagram in Fig. 2 the last degraded photon emitted at the point E has a lower energy than the last degraded photon emitted at the point N. It should be emphasized, however, that our arguments are statistically correct and they are the more justified the larger is the number of the intermediate multiple collisions.

Consider now all the low energy photons arriving from the downward direction Z and intercepted by the detector 12. The energies of these photons are much smaller than 2.3 mev. Therefore they represent the last degraded photons resulting from a multiple scattering. The original photons that underwent scattering were emitted by the thermal region 40 and had energies in the range from 2.3 to 9 mev. Because of multiple scattering, we can apply statistical considerations and assume that the initial energy of a photon in a scattering process has very little effect on the energy of the final degraded photons and that the energy of the finally degraded photons depends on the mean free path L of the last scattered photon.

Consider now the spectral distribution of the radiation received by the detector 12. The intensities of various components in this distribution are indicated on the meters 30, 31 . . . 37, 38. Let $N_1$ and $N_2$ represent the indications of the meters 30 and 31. The values $N_1$ represents the number of photons of energy $E_1$ arriving at the detector 12 and $N_2$, the corresponding number having energy $E_2$. Referring now to Fig. 2 it is seen that the photon of energy $E_1$ has a mean free path $L_1$ and the photon of the energy $E_2$ has a mean free path $L_2$. Consequently, we see from Fig. 1 that the photons transmitted through the gate 20 originate mostly at a distance $L_1$ below the earth's surface. It is noted that the meter 30 indicates the number $N_1$ of these photons and the larger is the value $N_1$ the larger is the scattering ability of the soil at the depth $L_1$, i.e. the larger is the density of the soil at the depth $L_1$. Similarly, the indication $N_2$ of the meter 31 represents the density of the soil at the depth $L_2$ where $L_2$ is the mean free path of the photons having energies $E_2$ that are indicated on the meter 31.

It is thus apparent that the meters 30, 31 . . . 38 indicate the properties of the soil at various depths below the earth's surface.

It should be noted that we may eliminate in the embodiments of Fig. 1 the source of neutrons and in such case the detector will respond to the gamma rays that are emitted by natural radio-elements present in the earth. These elements are continuously dispersed in the earth and therefore the spectral measurements of the radiations received by the detector can be correlated with the abundance of these elements at various distances from the detector. Consider now more specifically Fig. 1 and assume that the source 11 has been eliminated. Let $N_1$ and $N_2$ represent the indications of the meters 30 and 31. The value $N_1$ represents the number of photons of energy $E_1$ arriving at the detector and $N_2$ the corresponding number having energy $E_2$. Referring now to Fig. 2 it is seen that the photon of energy $E_1$ has a mean free path $L_1$ and the photon of energy $E_2$ has a mean free path $L_2$. Consequently, in our modified embodiment of Fig. 1 the photons transmitted through the gate 20 originate mostly at a distance $L_1$ below the earth's surface and the frequency of occurrence of these photons represents the abundance of radioactive elements at the depth $L_1$. Similarly, the frequency of arrival of photons transmitted through the gate 21 represents the abundance of radioactive elements at the depths $L_2$. Thus the indication of the meters 30 and 31 can be correlated with the abundance of radio-active elements at the depths $L_1$ and $L_2$ below the earth's surface.

Fig. 3a shows another embodiment of the directional detector 12 to be used in the arrangement of Fig. 1. This detector is of the type described in my copending application Serial No. 399,972. It comprises two scintillation crystals 101 and 102 aligned along the direction AC (or the direction of the arrow Z) of the incident photons, said crystals having associated therewith photomultipliers 103 and 104. As explained in said copending application, a photon causing two coincident impulses in the outputs of the photomultipliers 103 and 104 is aligned along the direction AC. Therefore, the rate of occurrence of such coincident impulses is an index of the intensity of photon flux aligned along the direction AC.

It is apparent that an incident photon arriving along the direction AC may undergo Compton scattering in the crystal 101, thus producing a flash of light due to the released Compton electron. The size of the crystal 101 is not too large so that no subsequent scattering takes place within this crystal, i.e. a single Compton interaction takes place. As a result of this interaction the scattered photon leaves the crystal 101 in the direction of CM and undergoes the next interaction and all subsequent interactions within the crystal 102. The crystal 102 is large and of relatively high density, and therefore it absorbs completely the photon scattered by the crystal 101. Thus the photomultipliers 103 and 104 associated with the crystals 101, 102 produce two coincident current impulses upon the arrival of a photon from the direction Z. The output pulses produced by the photomultiplier 103 are transmitted through a low pass pulse height selector 105 to a coincidence network 106. The network 105 is characterized by a threshold and is adapted to transmit only those impulses having magnitudes below said threshold. Similarly, the output pulses produced by the photomultiplier 104 are transmitted through a high pass pulse height selector 107 to the coincidence network 106. The network 107 is characterized by a threshold and is adapted to transmit only those impulses that have magnitudes above said threshold. The coincidence network 106 is in turn connected to the rate meter 108, the output of which is indicated on the meter 109. Thus the meter 109 indicates the rate of arrival of photons along the direction Z since these photons most frequently produce in the crystal 101 secondary photons that are aligned along the direction CM and are subsequently absorbed by the crystal 102. It is apparent that the most probable occurrence in Compton scattering corresponds to small values of $\theta$, where $\theta$ is the angle between the incident photon and the scattered photon produced in the crystal 101. As it is well known, and explained more in detail in a subsequent paragraph, the small values of the scattering angle $\theta$ are accompanied by small values of the recoil energy of the electron released in the crystal 101 as a result of the Compton collision, and consequently for a small value of $\theta$ the pulse produced in the output of the photomultiplier 103 is below the threshold value of the pulse height selector 105 and is applied to the coincidence network 106. Since the crystal 102 is relatively large, the secondary photon released along the direction CM may undergo several collisions within this crystal and thus dissipate all its energy. Thus the pulse produced in the output of the photomultiplier 104 is relatively large, i.e. above the threshold of the pulse height selector 107. This pulse is transmitted through the network 107 and applied to the coincidence network 106.

It may happen occasionally that a photon incident along the direction MC interacts with the crystal 101 and produces a secondary photon aligned along the direction CM (characterized by a large scattering angle $\theta$), said secondary photon interacting with the crystal 102. Under such condition, we may obtain two coincident pulses produced in the crystals 101 and 102 that are caused by a photon incident along the direction different from the direction AC and thus the directivity of the detector may be impaired. It should be noted, however, that such an occurrence is characterized by a large angle of scattering $\theta$. Therefore, the energy of the recoil electron released in the crystal 101 is relatively large and the pulse produced across the output of the photomultiplier 103 is correspondingly large and has a value above the threshold of the pulse height selector 105. This pulse cannot be transmitted to the coincidence network 106. Furthermore, the scattered photon interacting with the crystal 102 has a small energy and therefore the pulse produced in the photomultiplier 104 has a value below the threshold of the pulse height selector 107 and cannot be transmitted to the coincidence network 106. It is thus apparent that a pulse incident along the direction MC does not actuate the coincidence network 106 although it produces two coincident pulses in the photomultiplier 103 and 104.

It is further apparent that the arrangement of Fig. 3a is responsive only to photons arriving along the direction AC. The photons arriving along the opposite direction indicated by the arrow X are completely absorbed in the crystal 102 and do not produce any coincident pulses in the crystals 101 and 102.

Fig. 3b shows another embodiment of the directional detector 12. The photons incident along the direction Z are arranged to undergo a Compton interaction in the crystal 150. As a result of such an interaction, a portion of the energy of the incident photon is imparted to the recoil electron and the remaining portion of said energy is carried away by the secondary photon. The energy of the recoil electron is dissipated in the crystal 150, thus causing a current impulse to appear across the terminals 151 of the photomultiplier 152 associated with said crystal, the magnitude of said impulse representing said recoil energy.

Assume that the incident photon having energy $E_\gamma$ is aligned along the direction AC. Above the crystal 150 are positioned two crystals 155a and 155b that are arranged to receive only those photons originated as a result of Compton scattering in the crystal C that are aligned along the directions $CD_1$ and $CD_2$, respectively, each of said two directions forming with the original direction of the incident photon an angle $\theta$. It is well known that the energy $E'_\gamma$ of the scattered photon aligned along the direction $CD_1$ or $CD_2$ is related to the energy of the incident photon aligned along the direction $E_\gamma$ as follows:

$$E'_\gamma = \frac{E_\gamma}{1+\frac{E_\gamma}{mc^2}(1-\cos\theta)}$$

where $m$ is the mass of the electron.

It is apparent from the above formula that when $\theta$ is extremely small, i.e. when the scattered photon is emitted along the direction CD which is substantially in alignment with the incident direction AC, the scattered photon has substantially the same energy as the incident photon, i.e. $E'_\gamma \sim E_\gamma$. Under these conditions, the energy of the recoil electron released in the crystal 150 and equal to $(E_\gamma - E'_\gamma)$ is extremely small and the corresponding pulse produced across the output terminals 151 of the photomultiplier 152 is very small. This pulse may be too small to be detected since it may be of the same order of magnitude as the pulses generated spontaneously across the output terminals 151 as a result of the thermal noise in the photomultiplier 152 (the so-called dark current).

However, as the scattering angle increases the energy of the scattered photon $E'_\gamma$ decreases and consequently the energy $(E_\gamma - E'_\gamma)$ of the electron released in the crystal 150 becomes larger and for sufficiently large values of $\theta$ the pulse produced in the photomultiplier 152 becomes easily detectable. It is, however, desirable to select a value of $\theta$ which is not too large since, as it is well known from the formula of Klein-Nishina, and explained in our copending application Serial No. 399,972, the probability of Compton interaction for larger values of $\theta$ becomes smaller.

We select such a value of $\theta$ that the energy of the recoil electron produces a pulse which is approximately twice as large as the noise level of the photomultiplier 152 and therefore is small for all practical purposes and at the same time it is easily detectable.

If, for instance, the energy E of the incident photon is 1 mev., and if the noise level is such that the smallest impulses that are detectable originate by recoil electrons having energy $(E_\gamma - E'_\gamma) = 20$ kev. then $\theta = 8°12'$. If for instance, $E_\gamma = 3$ mev. and the energy of detectable recoil electron is 20 kev., then $\theta = 2°48'$.

The photons scattered in the crystal 150 and directed along the line $CD_1$ (or $CD_2$) interact with the crystal 155a (or 155b) and produce an impulse in the output of the photomultiplier 160a (or 160b). This output is applied to the coincidence network 170 together with the output of the photomultiplier 152. Therefore, an impulse produced in the output of the coincidence network 170 indicates (as explained in said copending application Serial No. 399,972) that a photon aligned along the direction AC interacted with the crystal C and that the scattered photon resulting from said interaction deviates from the original direction of the incident photon by a value $\theta$ which is as small as possible and corresponds to the smallest detectable energy value of the recoil electron released by said interaction. It is thus apparent that the output of the rate meter 180 indicated on the meter 190 represents the rate of arrival of incident photons aligned along the direction AC.

In the above considerations we took into account only the Compton scattering in the medium under investigation. The effectiveness in scattering the incident radiation is proportional to the number of electrons per cm.³ of the matter, i.e. to the density of the matter. A characteristic feature of this scattering process is that the number of photons that are incident on the medium under investigation is equal to the number of scattered photons, i.e. the medium acts merely as an agent that degrades the energy of the incident photons, but does not decrease their number, i.e. the medium does not absorb any photons. This is true if we consider photons in the energy region from about 1 mev. down to about 80 to 100 kev. However, below 80 kev., the photoelectric process becomes more and more pronounced, i.e. the process in which the photons are no longer scattered, but are completely absorbed. This photoelectric absorption process becomes more pronounced when the energy of the photon decreases. The following table gives the relative values of cross section in $10^{-24}$ cm.²/atom, for earth

| Energy of the photon | 100 kev. | 80 kev. | 60 kev. | 40 kev. | 20 kev. | 15 kev. | 10 kev. |
|---|---|---|---|---|---|---|---|
| Scattering | 6.79 | 7.26 | 8.1 | 9.8 | 15 | 19 | 29 |
| Photoelectric | .77 | 1.57 | 3.9 | 14.5 | 131 | 316 | 1,060 |

It is apparent from the above table that for 60 kev. the absorbing photoelectric effect is of the same order or magnitude as the scattering Compton effect. However, for lower energy photons the photoelectric absorbing effect becomes dominant. It should be noted that the effectiveness of the earth in absorbing photons by photoelectric effect increase as $Z^4$, i.e. proportional to the fourth power of the atomic number of the material.

Assume that the gate 20 in Fig. 1 is arranged so as to receive the pulses in an energy range below 60 kev., more specifically in an energy range extending from zero to 40 kev. Then the indication of the meter 30 would represent the atomic number of the layer of earth adjacent to the earth's surface. On the other hand, the indications of meters 31 to 38 correspond to the energy ranges in which scattering predominates and represents the density of corresponding regions of the soil. Furthermore, the indication of the meters 31 to 38 associated with the higher energy rays, increases in value if the density of the corresponding region of the soil increases. However, the output indicated on meter 30 decreases in value if the atomic number of the substance adjacent to the earth's surface increases. The decrease in the reading of meter 30 due to the increase in the atomic number can be explained by considering the nature of the photoelectric process which is an absorbing process, whereas the Compton process associated with higher energy photons is a scattering process. Thus the higher is the value of the atomic number, the more photons in the low energy region are absorbed in the earth and fewer photons are received at the detector and consequently the meter indicates a relatively low value. On the other hand, the higher is the density of the soil, the more photons in the high energy region are scattered by the soil back to the detector and thus the corresponding meter indicates a relatively high value. It is thus apparent that by properly differentiating between the response of the soil to rays of energy range in which absorption predominates and the response to rays of energy range in which scattering predominates valuable information may be obtained regarding the composition of the earth.

In some instances it may be desirable to replace the neutron source 11 shown in Fig. 1 by a suitable source of X-rays, which comprises a suitable beta ray emitter such as $Sr^{90}$-$Y^{90}$ placed adjacent to a lead target. The X-rays thus produced are due mainly to bremsstrahlung. A source of this type has been described by L. Reiffel in an article entitled "Beta Ray Excited Low Energy X-Ray Sources," Nucleonics, March 1955, pp. 22–24. Instead of the conventional radium-beryllium source 11 in Fig. 1 or the above referred to source of soft X-rays, we may use a source adapted to generate short bursts of about $10^{16}$ neutrons of 15 milliseconds duration. (For a description of such a source see article by H. C. Paxton, Critical Assemblies at Los Alamos, Nucleonics, October 1955, pp. 49–51.) It is also apparent that each of the referred to sources of gamma rays, X-rays, or neutrons may be lowered into a bore hole in the earth together with a suitable detector and the energy of the detected rays may be analyzed in a manner shown in Fig. 1 so as to yield information regarding the earth formations located at various distances from the wall of the bore hole.

Figures 4, 4A:
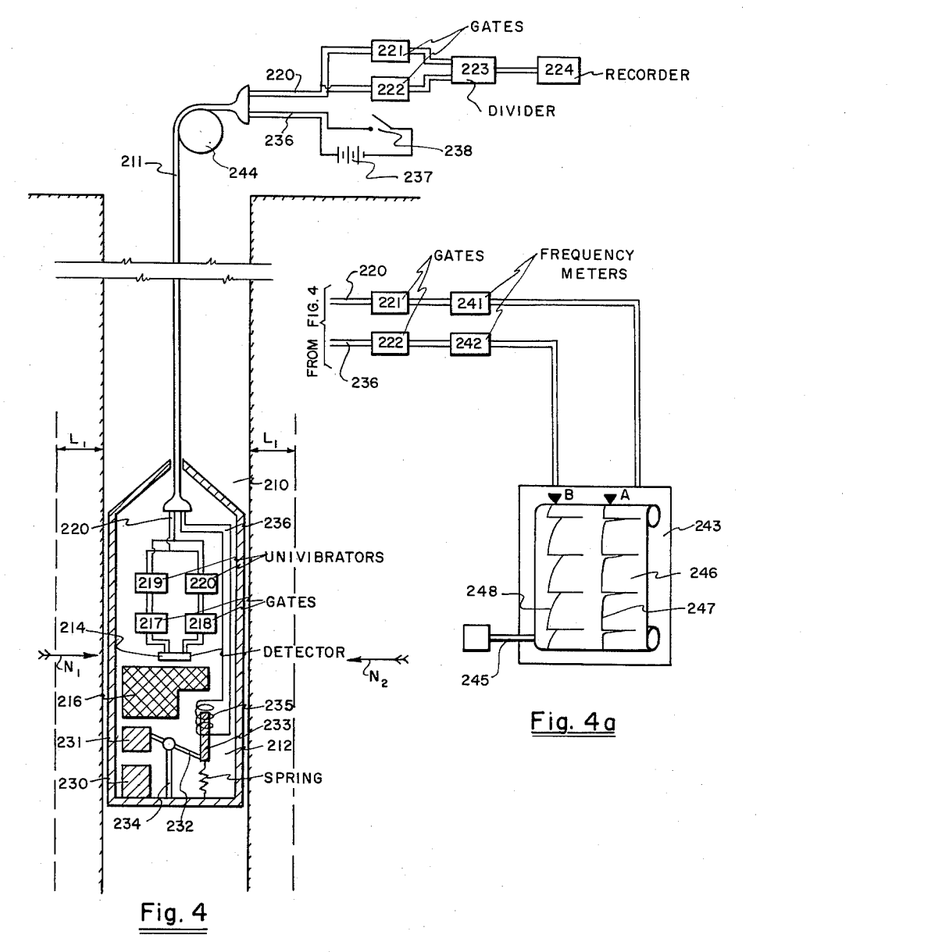
Fig. 4 represents diagrammatically the application of my invention in surveying bore holes.
Fig. 4a represents diagrammatically somewhat different apparatus that may be used at the surface of the ground in conjunction with the subsurface apparatus of Fig. 4.

Fig. 4 shows an application of my invention in a bore hole in which use is made of a pulsed source. Referring now more particularly to Figs. 4 and 4a, numeral 210 designates a bore hole and numeral 244 a hoist mechanism for lowering and raising a well logging instrument in the bore hole. The chart of the recorder 243 or 224 is driven by a shaft 245 which is connected to the hoist mechanism 244 in a manner well known in the art, or as an alternative the shaft 245 could be driven by a clock mechanism so as to drive the chart as a function of time. Cable 211 lowers the well logging instrument comprising a source of neutrons 212, a gamma ray detector 214 of the scintillation counter type, said detector being separated from the source by means of a suitable shield 216. Furthermore, the detector is directional and is arranged to receive incident rays along the radial directions $N_1$ and $N_2$. The outputs of the detector 214 is applied to gate networks 217 and 218, the networks 217 being adapted to transmit pulses having amplitude above a certain threshold value N and the network 218 being adapted to transmit pulses having amplitudes below said threshold values N. The outputs of networks 217 and 218 are respectively applied to univibrators 219 and 220. The univibrator 219 generates pulses of uniform magnitude $M_1$, each of said pulses being coincident with the corresponding pulses in the output of the network 217. Similarly, the univibrator 220 generates pulses of uniform magnitude $M_2$, said pulses being coincident with the corresponding pulse in the output of the network 218. Both univibrator outputs are transmitted to the top of the hole by means of leads 220 within the cable 211 and are applied to suitable gate networks 221 and 222. It should be noted that the values $M_1$ and $M_2$ are not directly related to the magnitude of the input pulses applied to the networks 217 and 218, and that it is desirable that the value $M_1$ differ considerably from $M_2$. It is well known that the two groups of pulses having magnitudes $M_1$ and $M_2$ that are applied at the input end of the leads 220 undergo considerable distortion as they travel along the cable. However, since there is a considerable margin of difference between the magnitudes of these pulses, there is no occurrence of cross feeding. The group of pulses derived from the output of the univibrator 219 and the group of pulses derived from the output of the univibrator 220 are still separable one from the other in spite of amplitude distortion that occurred during the transmission over the cable. Thus the first group is comprised within the amplitude range $M_1 \pm \Delta M_1$ and the second group is comprised within the amplitude range $M_2 \pm \Delta M_2$ where the values $\Delta M_1$ and $\Delta M_2$ represent the effects of amplitude distortion by the cable. Furthermore, if $M_1 > M_2$ we have $M_1 - \Delta M_1 > M_2 + \Delta M_2$, i.e. the two groups are separate and are separated by means of the gates 221 and 222. In order to accomplish such separation, it is necessary that the gate 221 transmit pulses within the range $M_1 \pm \Delta M_1$ and the gate 222 transmit pulses within the range $M_2 \pm \Delta M_2$. It is apparent that in accordance with the theory explained hereinabove, the output of the gate 221 associated with the low energy quanta detected by the counter 214 represents formation characteristics that are adjacent to the wall of the bore hole within relatively short distances from the detector, i.e. those formations that are at distances smaller than $L_1$ (as shown in Fig. 1). Furthermore, the output of the gate 222 is associated with high energy quanta detected by the counter 214 and represents the formation characteristics at distances larger than $L_1$.

In some instances, particularly in the study of the invasion of the bore hole fluids into the formation, it may be desirable to measure the ratio of the outputs of the gates 221 and 222, and with this purpose in mind the output of gates 221 and 222 are applied to a divider 223 which provides across its output leads current impulses that occur at a rate expressed by the quotient of the rates of impulses derived from the gates 221 and 222. The output of the divider is applied to a suitable recorder 224.

Consider now the pulsed neutron source 212 of Fig. 4. It consists essentially of two slugs of uranium 235 or plutonium 239 designated as 230 and 231 which under normal conditions are spaced one from the other at a sufficiently large distance so as to substantially prevent spontaneous fission. The slug 230 is stationary with respect to the bottom of the housing whereas the slug 231 is attached to the end of an arm 232, the other end of said arm being adapted to support a ferromagnetic rod 233. The arm 232 is rotatable on a support 234, thus forming a lever. The rod 233 cooperates with a solenoid 235. Thus when an electric current is made to pass through the solenoid 235, it attracts the rod 233 which in turn turns the arm 232 and decreases the distance between the two uranium slugs 230 and 231. The terminals of the solenoid 235 are connected to the leads 236 which extend through the cable 211 to the top of the bore hole and are connected to a battery 237 in series with a switch 238. Thus by closing the switch 238, we energize the solenoid 235 which actuates the arm 232 of the lever and causes the slug 231 to be displaced downward to the neighborhood of its most effective location adjacently to the slug 230. The system is then a little above critical. The fission rate rises extremely rapidly, the uranium heats and expands, thus dropping the reactivity enough to terminate the fission burst. Thus a potentially run away burst is stopped by thermal action. In a typical burst of this type, the initial rise in fission is exponential with a period of about 15 milliseconds and continues to a maximum power level of nearly $10^9$ watts. The burst is about 50 milliseconds long and the energy developed is that of $10^{16}$ fissions or about 100 watt-hours.

The pulsed neutron source described in connection with Fig. 4 can be used in the place of an ordinary neutron source (such as radium-beryllium) for the practice of the materials analyses described hereinabove in connection with Figs. 1 to 3. It can also be used to considerable advantage in well logging as illustrated in Fig. 4 and Fig. 4a. A number of methods of employment can be used; for example, the instrument can traverse the bore hole in conventional manner and thus on the recorder 224 of Fig. 4 will be produced a record that would be similar to one that would be produced with a radium-beryllium neutron source except for the intermittency due to the fact that the source is pulsed. Another method of employment of the pulsed neutron source is illustrated by the Fig. 4a in which the cable leads 220 and 236 of Fig. 4 connect to a somewhat different apparatus arrangement at the surface of the ground, the subsurface arrangement being identical with that of Fig. 4. In Fig. 4a gates 221 and 222 connect respectively to frequency meters 241 and 242 which in turn connect to a recorder 243, each frequency meter actuating an individual pen. Each time the neutron source 212 is pulsed, the formations are irradiated by an extremely powerful bombardment of neutrons and activity is induced in some of the elements that constitute the formations. After each burst, the radiations are detected by the detector 214. The radiation intensity then decays with a rate which is a characteristic of the nature of the surrounding formation and by suitably adjusting gates 221 and 222 the decay characteristics of two different energy levels of rays can be observed on the chart of recorder 243. Thus, for example, it is seen that the radiation decay characteristic of the radiation plotted by pen A in the form of graph 247 is considerably faster than the radiation decay characteristic plotted by pen B in the form of graph 248. The decay characteristics can yield valuable information regarding the nature of the surrounding strata.

Figures 5, 6:
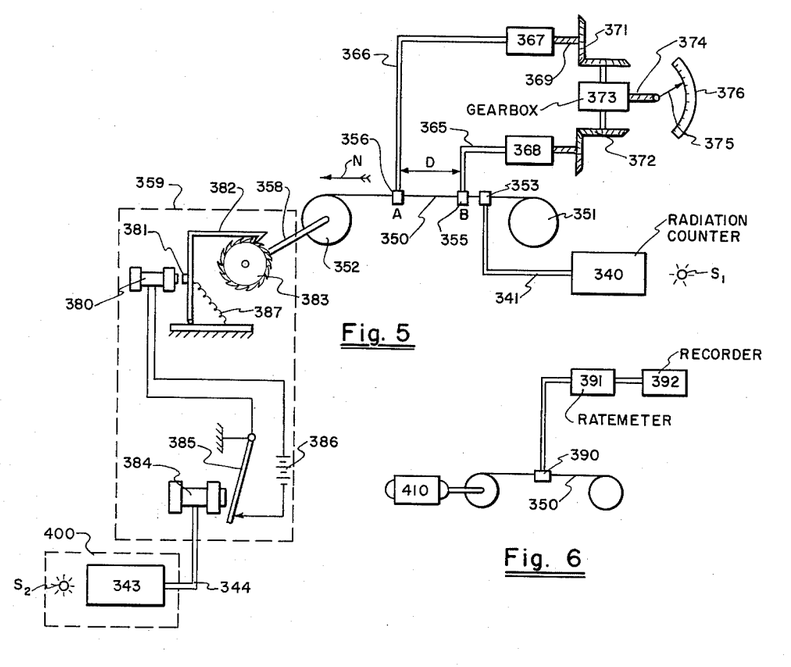
Fig. 5 shows a divider for producing a quotient of two varying quantities, said divider comprising a recording head and two suitably placed reproducing heads.
Fig. 6 shows a modified divider for reproducing records impressed by means of the arrangement of Fig. 5.

Consider now more in detail the divider designated diagrammatically by the block 223 in Fig. 4. The structure and method of operation of such a divider is illustrated in Fig. 5. Referring now more particularly to Fig. 5, there is shown diagrammatically an arrangement for indicating and recording the ratio of the radiation intensities of two sources designated as $S_1$ and $S_2$. The source $S_1$ is placed adjacently to a standard Geiger counter or scintillation counter 340 which produces across its output leads 341 a succession of electrical pulses, the rate of occurrence of which represents the intensity of the source $S_1$. Similarly, the source $S_2$ is placed adjacently to a standard Geiger counter or scintillation counter 343 which produces across its output leads 344 a succession of pulses, the rate of occurrence of which represents the intensity of the source $S_2$.

The counters 340 and 343 operate in conjunction with a recorder-reproducer system that comprises a spool which is arranged to move an elongated record medium, such as a magnetic recorder wire 350 in the direction indicated by the arrow N from spool 351 to spool 352. The wire has associated with it a magnetic recording head 353 which is arranged to produce a magnetic mark on the record wire each time an electric impulse is applied to the input leads 341 of the recording head. These pulses are subsequently reproduced by reproducer heads 355 and 356 associated with said magnetic wire and spaced one from the other by a certain fixed distance D. The driving spool 352 is mounted on a shaft 358, said shaft being driven by an electro-mechanical transducer comprised within a dashed block 359. This transducer is provided with input leads 344 and is adapted to rotate the shaft 359 in such a manner that the angular displacement of said shaft from any initial instant of time is equal to the total number of impulses applied to the input lead 344 since said instant of time. The leads 344 are connected to the output of a Geiger or scintillation counter 343 which is placed adjacently to the source $S_2$.

It is apparent that the source $S_2$ controls the linear motion of the magnetic wire 350 since the radiation quanta intercepted by the counter 343 produces simultaneous impulses across the leads 344 and these impulses actuate the electromechanical transducer 359 which in turn drives the spool 352 in a manner explained hereinabove.

The recording head 353 is connected to the output leads of the counter 340 which is placed adjacently to the source $S_1$. It is apparent that since the lineal motion of the wire 350 depends on the source $S_2$ and the impression made by the recording head 355 depend on the source $S_1$, the number of said impressions per unit length of the wire 350 depend on a definite relationship between the sources $S_1$ and $S_2$, and more particularly upon the ratio of impulses obtained by means of the counter 340 to impulses obtained by means of the counter 343.

The output leads 365 and 366 of the reproducer heads 355 and 356 are applied to electromechanical transducers 367 and 368, respectively. Each of the transducers 367, 368 is similar to the one comprised within the dashed rectangle 359. Thus the transducer 367 drives the shaft 369 in uniform angular increments in response to pulses applied to leads 366 in such a manner that each increment corresponds to one pulse, and thus the total angular displacement of the shaft 369 represents the number of pulses across the leads 366. Similarly, the total angular displacement of the shaft 370 represents the number of pulses across the leads 365. The shaft 369 and shaft 370 are in turn applied through respective gear sets 371 and 372 to a differential gear box 373. The output shaft 374 of the differential gear box is provided with an indicator 375 arranged for movement over a circular scale, indicated in part as 376. The angular displacement of shaft 374 from an initial position represents or is proportional to the difference between the angular displacements of shafts 369 and 370. Furthermore, the angular displacement of the shafts 374 and thus the indicator 375 represents the number of impulses derived from the counter 340 and recorded on the segment of wire between the reproducing heads 355, 356 and having length D. Consequently, the indicator 375 represents the ratio of the number of pulses obtained from the source $S_1$ to the number of impulses obtained from the source $S_2$. It should be pointed out that shaft 374 and indicator 375 can be made to operate the recorder pen of a strip chart recorder and thus the indication can be recorded as a function of time or as a function of any other variable.

It is apparent that instead of using a magnetic wire for the recording medium, recording tapes and similar recorder media can be used, and various well known arrangements such as a capstan drive can be used to maintain precise relationship between the angular displacement of shaft 358 and the lineal displacement of the wire or tape member 350. Also, other types of apparatus can be used, such, for example, as a paper strip adapted to be perforated and having associated with it devices for producing impulses in response to the perforation.

Consider now the electromechanical transducer of the type designated by blocks 359, 367, and 368. This transducer comprises an electromagnet 380 which cooperates with an armature 381 connected to a member 382 arranged to actuate a ratchet wheel 383 in an obvious manner. Whenever the electromagnet 380 is energized it attracts armature 381, thereby rotating ratchet wheel 383. Whenever a pulse occurs at the output leads 344 of the counter 343 an electromagnet 384 is energized, thus causing opening of a switch 385 in the circuit comprising a battery 386 and supplying current to electromagnet 380 and thereby allowing a spring 387 to retract rod 382 and cause it to engage a succeeding tooth of ratchet wheel 383. After an interval of time, the pulse applied to electromagnet 384 disappears, and thus electromagnet 384 drops the switch 385 which again closes the circuit of battery 386 and the latter energizes electromagnet 380. Electromagnet 380 then attracts armature 381 and moves ratchet wheel 383. It should be noted that the ratchet wheel 383 drives by means of the shaft 358 the spool 352. Consequently, the angular displacement of the driving spool 352 or the linear displacement of the magnetic wire 350 is proportional to the number of impulses obtained from the output leads 344 of the counter 343.

In order to understand better the operation of this arrangement, consider a certain time interval T during which the source $S_2$ does not vary in intensity and furthermore, the radiation quanta emitted by this source are uniformly distributed in time, i.e. they succeed each other after definite and equal time increments. Thus we obtain across the leads 344 a succession of pulses, each pulse being separated from its preceding pulse by the same time increment. Then the shaft 358 moves by uniform angular increments that are equally spaced in time. Also the wire 350 moves by uniform linear increments equally spaced in time, each of said increments being coincident with the occurrence of the pulse at the output leads 344 of the counter. It is apparent that the mean linear velocity V of the wire during said time interval T is proportional to the rate occurrence of pulses at the output leads of the counter 343. As the wire 350 moves, it receives magnetic impression from the head 353, said impression being coincident with the impulses at the output leads 341 of the counter 340. The total linear displacement of the wire during the time interval T is $L = VT$. It is apparent that the number of magnetic impressions made on the segment of wire of the length L during said time T is proportional to the rate of occurrence of pulses at the output of the counter 340 and is inversely proportional to the mean velocity V, i.e. it is inversely proportional to the rate of occurrence of pulses at the output of the counter 343. Thus the number of magnetic impressions made represents the ratio or quotient of rate of impulses derived from the counter 340 and the rate of impulses derived from the counter 343. It is our purpose to measure the above ratio, i.e. to determine the number of magnetic impressions made on a segment of wire of length L. This is accomplished by arranging the magnetic reproducers 355 and 356 so as to be distant one from the other by the length D. The pulses derived from the reproducer 356 actuate the transducer 367 which in turn rotates the shaft 369 in such a manner that the total angular displacement of said shaft represents the total number of magnetic impressions made on a length of wire that is compressed between a certain initial point (corresponding to the beginning of recording) and the point A at which the head 356 is positioned. Similarly, the pulses derived from the reproducer 355 actuate the transducer 368 which in turn rotates the shaft 370 in such a manner that the total angular displacement of said shaft represents the total number of magnetic impressions made on a length of wire that is comprised between said initial point and the point B at which the head 355 is positioned. It is thus seen that the angular displacement of the shaft 374 is proportional to the difference between the number of impressions from the initial point to the point A and the number of impressions from the initial point to the point B. Consequently, the displacement of the shaft 374 and the indications of the pointer 375 represent the number of impressions made on the wire segment between the points A and B, i.e. it represents the desired quotient of the rate of impulses associated with the source $S_1$ and the rate of impulses associated with the source $S_2$.

It is apparent that the index of the ratio of said two quantities may be obtained in a different manner. For instance, the reproducers 355, 356 and all the equipment associated with said reproducers may be eliminated from the arrangement of Fig. 5 which then acts merely as a recorder. The drive of the recorder is controlled by the source $S_2$ and the magnetic recording made on the wire 350 are made in accordance with the quanta emitted by the source $S_1$. After the recording is completed, the magnetic wire is placed on the reproducer shown in Fig. 6 which is driven at a constant speed by the motor 410. Thus we obtain at the output of the reproducer 390 associated with said wire, electric impulses, the rate of occurrence of which is represented by the quotient of the rate of occurrence of impulses due to the sources $S_1$ and $S_2$. The pulses from the output of the reproducer 390 are applied to the rate meter 391 which is in turn applied to an indicator 392. It is apparent that the indication of recorder 392 represents the desired quotient.

Figure 7A:
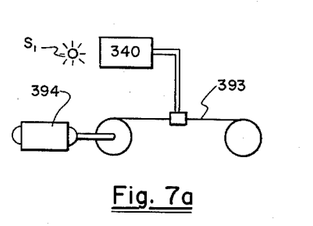
Fig. 7a shows a means including magnetic recorder driven at a constant speed for magnetically recording the output of a radiation source.
Figure 7B:
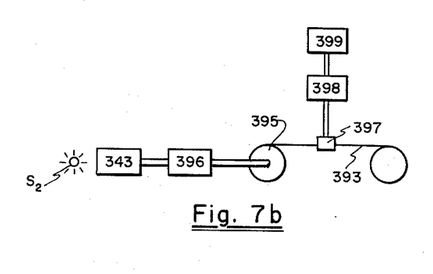

Another method of obtaining the desired quotient is illustrated in Fig. 7a and Fig. 7b. As shown in Fig. 7a, the impulses detected near the source $S_1$ are recorded on a magnetic tape 393 that is driven at a constant speed by means of the motor 394. After the recording is completed, the tape 393 is put on the reproducer shown in Fig. 7b which is driven by a spool 395 that has its shaft applied to the electromechanical transducer 396 similar to the one designated by blocks 359, 367, 368, in Fig. 5. The transducer 396 is in turn energized by the impulses detected near the source $S_2$ by the counter 343. Thus we obtain at the output of the reproducer 397 associated with the wire 393 electric impulses, the rate of occurrence of which represents the quotient of the impulses due to sources $S_1$ and $S_2$. These pulses are applied to a rate meter 398 which is in turn applied to an indicator or recorder 399.

In some instances it may be desirable to produce a quotient of the number of impulses obtained from the source $S_1$ which is being investigated to a reference source $S_2$, particularly in case in which both sources, i.e. the unknown source $S_1$ and the reference source $S_2$ decay in time and are characterized by the same time constant. In such instances, we may replace the reference source $S_2$ and the counter 343 (both enclosed within the dotted rectangle 400) by a "synthetic source" shown in Fig. 8 which generates across the output terminals 344 a succession of pulses similar to those obtained in Fig. 6 by means of the source $S_2$ and the counter 343. Such a synthetic source may be obtained, for instance, by means of the arrangement of Fig. 7a in which the magnetic wire is driven at a constant linear speed by means of the motor 394 and the magnetic impressions are made on said wire by means of a magnetic head that receives the impulses obtained from the counter 340 placed adjacent to the source $S_1$.

Figure 8:
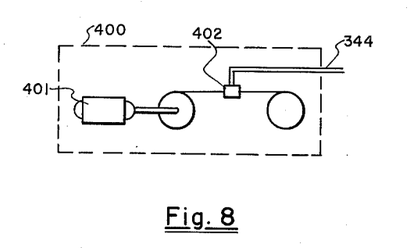
Fig. 8 shows a means for obtaining a "synthetic" radioactivity source.

The magnetic record thus obtained is placed on a reproducer shown in Fig. 8 in which it is moved at a constant speed by the motor 401. If the speed of the wire during the reproduction is the same as during the recording, the impulses produced at the output leads 344 of the reproducer head 402 are the same as those that would be obtained in the arrangement shown in Fig. 5 within the block 400, said arrangement comprising the source $S_2$. It is thus seen that the reference source $S_2$ may be replaced by the magnetic reproducer system of the type shown in Fig. 8. It is further apparent that by doubling the speed of the motor 401, the impulses obtained from the leads 344 in Fig. 8 would decay at a faster rate and the arrangement will represent a synthetic source having a half-life that is half as long. Thus by assigning to the motor 401 various speeds, we can simulate the behavior of radioactive sources of various half-lives.

I claim:

1. A directional detector for gamma rays comprising a first scintillating phosphor and a photomultiplier therefor, a plurality of other scintillating phosphors, each provided with a photomultiplier, said other phosphors being spaced away from said first phosphor and disposed symmetrically with respect thereto to define an axis of symmetry passing through said first phosphor and defining an angle $\theta$ between said axis of symmetry and each of the straight lines joining said first phosphor and said other phosphors, a coincidence network having two inputs, one of said inputs being fed by said first photomultiplier and the other of said inputs being fed by said other photomultipliers, operative to transmit impulses therefrom occurring substantially in time coincidence, and counting means fed by said coincidence network operative to measure the rate of occurrence of said time-coincident impulses.

2. A directional detector for gamma rays comprising a first scintillating phosphor and a photomultiplier therefor, a plurality of other scintillating phosphors, each provided with a photomultiplier, said other phosphors being spaced away from said first phosphor and disposed symmetrically with respect thereto to define an axis of symmetry passing through said first phosphor and defining an angle $\theta$ between said axis of symmetry and each of the straight lines joining said first phosphor and said other phosphors, a coincidence network having two inputs, one of said inputs being fed by said first photomultiplier and the other of said inputs being fed by said other photomultipliers, operative to transmit impulses therefrom occurring substantially in time coincidence, and counting means fed by said coincidence network operative to measure the rate of occurrence of said time-coincident impulses, the orientation of said phosphors being selected to define the angle $\theta$ at a magnitude such that a gamma ray striking said first phosphor along the axis of symmetry and interacting therewith to produce a scattered ray directed toward one of said other phosphors will produce in said first photomultiplier an impulse of amplitude substantially greater than the random noise impulses generated in said first photomultiplier.

3. A directional detector for gamma rays comprising a first scintillating phosphor and a photomultiplier therefor, a plurality of other scintillating phosphors, each provided with a photomultiplier, said other phosphors being spaced away from said first phosphor and disposed symmetrically with respect thereto to define an axis of symmetry passing through said first phosphor and defining an angle $\theta$ between said axis of symmetry and each of the straight lines joining said first phosphor and said other phosphors, a coincidence network having two inputs, one of said inputs being fed by said first photomultiplier and the other of said inputs being fed by said other photomultipliers, operative to transmit impulses therefrom occurring substantially in time coincidence, and counting means fed by said coincidence network operative to measure the rate of occurrence of said time-coincident impulses, the orientation of said phosphors being selected to define the angle $\theta$ at a magnitude such that a gamma ray striking said first phosphor along the axis of symmetry and interacting therewith to produce a scattered ray directed toward one of said other phosphors will produce in said first photomultiplier an impulse of amplitude approximately twice as large as the random noise impulses generated by said first photomultiplier.

4. A directional detector for gamma rays comprising a first scintillating phosphor and a photomultiplier therefor, two other scintillating phosphors, each provided with a photomultiplier, said other phosphors being spaced away from said first phosphor and disposed symmetrically with respect thereto to define an axis of symmetry passing through said first phosphor and defining an angle $\theta$ between said axis of symmetry and each of the straight lines joining said first phosphor and said other phosphors, a coincidence network having two inputs, one of said inputs being fed by said first photomultiplier and the other of said inputs being fed by said other photomultipliers, operative to transmit impulses therefrom occurring substantially in time coincidence, and counting means fed by said coincidence network operative to measure the rate of occurrence of said time-coincident impulses, the orientation of said phosphors being selected to define the angle $\theta$ at a magnitude such that a gamma ray striking said first phosphor along the axis of symmetry and interacting therewith to produce a scattered ray directed toward one of said other phosphors will produce in said first photomultiplier an impulse of amplitude approximately twice as large as the random noise impulses generated by said first photomultiplier.

References Cited in the file of this patent

UNITED STATES PATENTS

| | | |
|---|---|---|
| 2,275,748 | Fearson | Mar. 10, 1942 |
| 2,617,042 | Wouters | Nov. 4, 1952 |
| 2,648,780 | Herzog | Aug. 11, 1953 |
| 2,725,485 | Scherbatskoy | Nov. 29, 1955 |
| 2,739,242 | Armistead | Mar. 20, 1956 |
| 2,740,898 | Youmans | Apr. 3, 1956 |
| 2,755,389 | Jones et al. | July 17, 1956 |

OTHER REFERENCES

Cooke-Yarborough et al.: "A Pulse-Amplitude Analyser of Improved Design," from Proceedings of the Institute of Electrical Engineers, Part III, March 1950, pages 108–121, particularly pages 108–113.

Measurement of Gamma-Ray Energies With Two Crystals in Coincidence, by R. Hofstadter and J. A. McIntyre, from Physical Review, vol. 78, April–June 1950, pp. 619–620.

Gamma-Ray Measurements With Na I (Tl) Crystals, by R. Hofstadter and J. A. McIntyre, from Physical Review, vol. 79, No. 2, July 15, 1950, pp. 389–391.

Two-Crystal Gamma-Ray Scintillation Sepectrometer, by R. E. Connally, from The Review of Scientific Instruments, vol. 24, No. 6, June 1953, pp. 458, 459.